(12) United States Patent
Yu

(10) Patent No.: US 12,373,785 B2
(45) Date of Patent: Jul. 29, 2025

(54) MULTI-DIMENSIONAL ORDER MERGING METHOD

(71) Applicant: WUXI HYESOFT SOFTWARE TECHNOLOGY CO., LTD., Wuxi (CN)

(72) Inventor: Liqun Yu, Wuxi (CN)

(73) Assignee: WUXI HYESOFT SOFTWARE TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/763,754

(22) Filed: Jul. 3, 2024

(65) Prior Publication Data

US 2024/0354702 A1 Oct. 24, 2024

Related U.S. Application Data

(63) Continuation of application No. PCT/CN2024/082676, filed on Mar. 20, 2024.

(30) Foreign Application Priority Data

Apr. 4, 2023 (CN) .......................... 202310354039.2

(51) Int. Cl.
*G06Q 10/087* (2023.01)
(52) U.S. Cl.
CPC .................. *G06Q 10/087* (2013.01)
(58) Field of Classification Search
CPC .................................................. G06Q 10/087
See application file for complete search history.

(56) References Cited

U.S. PATENT DOCUMENTS

| 7,657,466 B2* | 2/2010 | Klingenberg ...... G06Q 10/0834 705/28 |
| 2019/0114564 A1* | 4/2019 | Ferguson .......... G06Q 10/06315 |
| 2020/0239234 A1* | 7/2020 | Chen .................... B65G 1/1373 |

FOREIGN PATENT DOCUMENTS

| CN | 106809586 A | 6/2017 |
| CN | 107203921 A | 9/2017 |
| CN | 110834935 A | 2/2020 |

(Continued)

OTHER PUBLICATIONS

International Search Report issued in corresponding PCT Application No. PCT/CN2024/082676, dated May 6, 2024.

(Continued)

*Primary Examiner* — Aryan E Weisenfeld
(74) *Attorney, Agent, or Firm* — Westbridge IP LLC

(57) ABSTRACT

Disclosed is a multi-dimensional order merging method, which belongs to the field of warehousing technology. By considering multiple dimensions such as the required arrival time of the order, order destination, picking location overlap degree within the order, order size, weather conditions, road condition information, transportation vehicle conditions, picking costs, and logistics costs, and by considering the combination and arrangement sequence, a multi-dimensional order merging method is determined, which can be applied in various scenarios in the warehousing field. According to this method, merged order processing tasks can distribute multiple orders at the same time to meet the premise of the personalized delivery needs of customers, reduce costs as much as possible, and improve delivery efficiency.

8 Claims, 2 Drawing Sheets

(56) References Cited

FOREIGN PATENT DOCUMENTS

| CN | 113205299 A | 8/2021 |
| CN | 113762668 A | 12/2021 |
| CN | 116523436 A | 8/2023 |
| CN | 116542599 A | 8/2023 |

OTHER PUBLICATIONS

Written Opinion issued in corresponding PCT Application No. PCT/CN2024/082676, dated May 6, 2024.

* cited by examiner

MULTI-DIMENSIONAL ORDER MERGING METHOD

CROSS-REFERENCE TO RELATED APPLICATIONS

This application is a continuation of International Application No. PCT/CN2024/082676, filed on Mar. 20, 2024, which claims priority to Chinese Patent Application No. 202310354039.2, filed on Apr. 4, 2023. All of the aforementioned applications are incorporated herein by reference in their entireties.

TECHNICAL FIELD

The present disclosure herein relates to a multi-dimensional order merging method, which belongs to the field of warehousing technology.

BACKGROUND

In the field of warehouse management technology, the two most basic modes of warehouse picking operations are the "fruit-picking" picking mode and the "seeding" picking mode. The so-called "fruit-picking" picking model refers to picking for each order. Pickers or equipment traverse through each cargo storage location to take out and package the goods on the orders being processed. As it resembles the action of picking fruits, it is therefore called the "fruit-picking" picking model. The "seeding" picking model, also known as "picking fruits first and sowing later," refers to the collection of multiple orders into a batch. First, the quantities of each good are summarized and taken out separately, which resembles the action of picking fruits. Then, the multiple orders involved are divided and packaged one by one, which resembles the action of seeding. Therefore, it is called the "picking fruits first and sowing later" picking model.

SUMMARY

Among the above two modes, the "seeding" picking mode can pick and sow multiple or even dozens or hundreds of orders at the same time, and the picking efficiency is much higher than that of the "fruit-picking" picking mode. However, it also requires an additional "seeding" region, that is, after picking fruits, when sorting and packaging the multiple orders involved one by one, an additional large space needs to be set up. If hundreds of orders are involved, a space for placing hundreds of order boxes needs to be set up at the same time, and the business process is long and there are many processing steps.

Combining the above two modes, the inventor proposed a "live-streaming" picking method, that is, to directly realize the "seeding" of multiple orders while picking goods. In this mode, considering the picking efficiency, orders need to be merged before allocation, but the order merger rules in the prior art are relatively simple. For example, when multiple or even dozens or hundreds of orders are picked at the same time in the above "seeding" picking mode, a batch of orders is only merged to pick fruits according to the time order received, and does not involve any other merger rules. CN108573423A transaction order processing method, device and system proposes to merge orders containing goods in the same sorting region. CN108154328A time prompt method and device, electronic equipment, and computer readable storage medium proposes to merge orders based on order similarity and receiving address, etc. These relatively single merging rules cannot meet the requirements of some warehouse centers to meet customers' personalized delivery needs, reduce logistics costs as much as possible, and improve picking efficiency. Therefore, it is necessary to develop a multi-dimensional order merging method to meet the needs of "live-streaming" picking method needs.

In order to solve the current problems, the present disclosure provides a multi-dimensional order merging method, and the method including: Step 1: obtaining order information that needs to be processed according to preset conditions, and classifying orders that meet the preset conditions into a batch; Step 2: pre-merging orders according to the order's delivery address, arrival time and storage location information of the goods included in the order, and placing pre-merged orders as one order into an order pool together with other orders that have not been pre-merged, then executing the following Step 3; Step 3: judging whether a size of each order in the order pool exceeds a first threshold or not, and if it exceeds the first threshold, generating a separate distribution task for the order; if it does not exceed the first threshold, then proceeding to Step 4; and determining the first threshold according to a maximum order size that a Radio Frequency Identification (RFID) picking vehicle can carry; Step 4: classifying orders whose order size does not exceed the first threshold according to the region to which the delivery address of the order belongs, arrival time, and storage location information of the goods included in the order; and Step 5: for each order within the same category, generating a distribution task for every N orders according to a picking location overlap degree, where N is determined according to the sorting position configured by the RFID picking vehicle.

Optionally, the preset conditions in Step 1 includes time, region, goods or others.

Optionally, Step 1 includes: classifying all orders received within a predetermined time range into one batch according to the order placing time; or classifying orders with the delivery address in the same region into one batch; or classifying orders containing specific goods into one batch.

Optionally, Step 2 includes: pre-merging orders that simultaneously meet the following conditions into one order: condition 1: the arrival time is within the same time period; condition 2: the delivery address is completely identical; and condition 3: the included goods are stored in the same region.

Optionally, before Step 2, which involves pre-merging orders that simultaneously meet the above-mentioned conditions 1 to 3 into one order, further comprising: judging whether the size of each order that simultaneously meets the above-mentioned conditions 1 to 3 exceeds a second threshold; if the size of orders that simultaneously meet the above-mentioned conditions 1 to 3 exceeds the second threshold, no pre-merging will be performed and it will be directly placed into the order pool; and the second threshold is an artificially set threshold.

Optionally, Step 4 includes: classifying orders that meet the following three conditions into one category: condition 1: the delivery address belongs to a same region, and the region refers to an administrative region or regions divided according to the sales model of the retail industry; condition 2: the arrival time is within the same time period; and condition 3: the included goods are stored in the same region.

Optionally, the Step 5 includes: treating all orders classified into the same category as a processing unit; selecting orders with the largest order size from any processing unit;

calculating the picking location overlap degree of the remaining orders in the processing unit with the largest size order, and generating a distribution task together with the N−1 orders that have the highest picking location overlap degree with the largest size order; removing the N orders corresponding to the distribution task from the processing unit; and executing the above process with the remaining orders in the processing unit as a new processing unit, until all orders in this category are generated as the distribution task.

Optionally, the Step 5 includes: treating all orders classified into the same category as a processing unit; selecting the order with the largest order size form any processing unit; calculating the picking location overlap degree of the remaining orders with the largest size order, and generating a first virtual order together with orders that have the highest picking location overlap degree with the largest size order; calculating the picking location overlap degree of the remaining orders with the first virtual order, and generating a second virtual order together with orders that have the highest picking location overlap degree of the first virtual order; . . . , and so on, until the N−1th virtual order is generated, generating a distribution task for the N orders included in the N−1th virtual order; and removing the N orders corresponding to the distribution task from the processing unit; and executing the above process with the remaining orders in the processing unit as a new processing unit, until all orders in this category are generated as the distribution task.

Optionally, the picking position is a passage where the goods storage is located, or the picking position is a specific position of the passage corresponding to the goods storage.

Optionally, the method also includes: Step 6: setting priority for each distribution task according to custom factors, the custom factors comprises arrival time, the region to which the delivery address belongs, order size, goods included in the order or goods inventory in the warehouse center.

The present disclosure provides a multi-dimensional order merging method. By considering multiple dimensions such as the required arrival time of the order, order destination, picking location overlap degree within the order, order size, weather conditions, road condition information, transportation vehicle conditions, picking costs, and logistics costs, and by considering the combination and arrangement sequence, a multi-dimensional order merging method is determined, which can be applied in various scenarios in the warehousing field. According to this method, merged order processing tasks can distribute multiple orders at the same time to meet the personalized delivery needs of customers, reduce costs as much as possible, and improve delivery efficiency.

BRIEF DESCRIPTION OF THE DRAWINGS

In order to more clearly illustrate the technical solutions in the embodiments of the present disclosure, the accompanying drawings needed to be used in the description of the embodiments will be briefly introduced below. Obviously, the accompanying drawings in the following description are only some embodiments of the present disclosure. For those ordinary skilled in the art, other accompanying drawings can also be obtained based on these drawings without exerting creative efforts.

DETAILED DESCRIPTION OF THE EMBODIMENTS

In order to make the purpose, technical solutions and advantages of the present disclosure clearer, the embodiments of the present disclosure will be further described in detail below with reference to the accompanying drawings.

Figure 1:
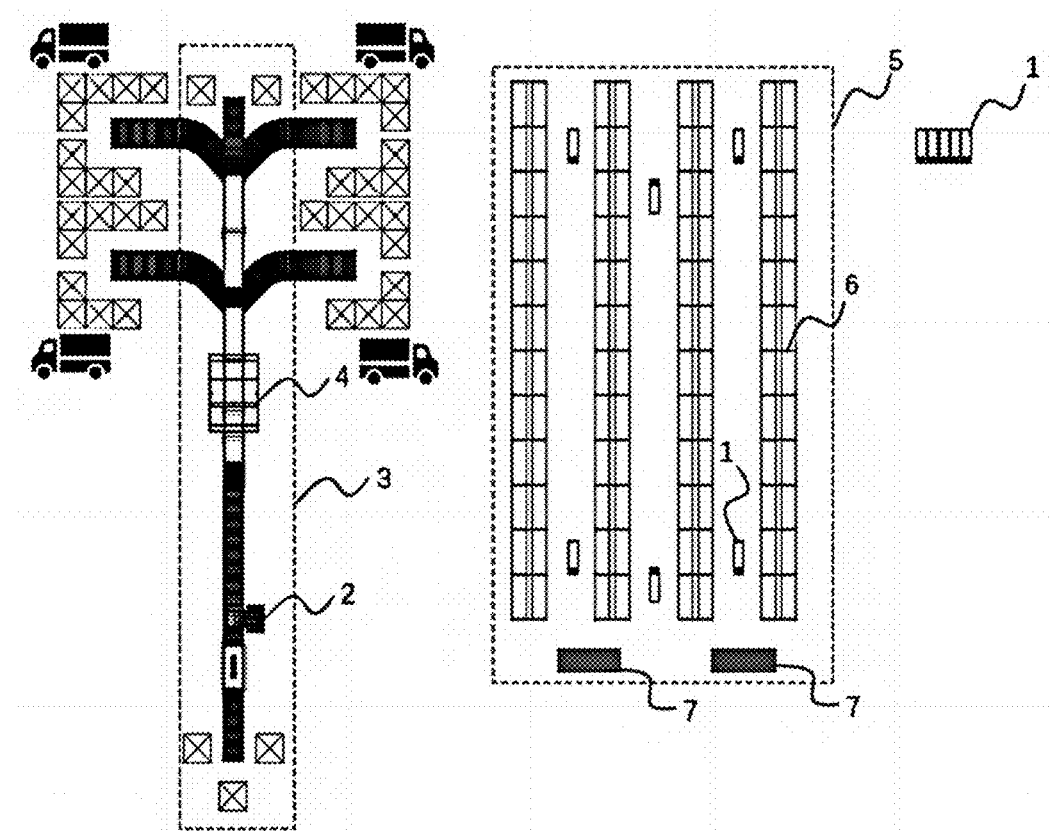
FIG. 1 is a schematic diagram of a "live-streaming" warehouse management system.

FIG. 1 is a "live-streaming" warehouse management system proposed by the inventor. The system includes: a data processing center, an RFID picking vehicle 1, an RFID channel machine 2 and an automatic distribution line 3. The RFID picking vehicle 1 is configured with a picking processor, the RFID channel machine 2 is configured with a first verification processor. The RFID channel machine 2 is installed at the container put-in port of the automatic distribution line 3. The automatic distribution line 3 is also configured with a Dimensioning, Weighing & Scanning (DWS) equipment 4, the DWS equipment 4 is installed in front of each distribution port of the automatic distribution line 3. The RFID channel machine 2 is also configured with a box code scanning device and an RFID reader/writer; the DWS equipment 4 is configured with a second verification processor.

The operating space required by this "live-streaming" warehouse management system is only used to set up a warehouse 5 and the automatic distribution line 3. The warehouse is provided with rows of shelves 6 inside, one end of the shelf 6 is provided with a goods collection region 7, and the goods collection region 7 is used for temporary storage of packed containers and empty boxes. Each RFID picking vehicle 1 shuttles through the shelf channel to simultaneously implement multiple order picking, first verification, sealing, printing and pasting of box codes and other packaging processes. The picking personnel directly place the packed boxes in the goods collection region 7, the transport personnel who are responsible for transporting the containers will transport and place the containers into the put-in port of the automatic distribution line 3. After passing through the RFID channel machine 2, the containers enter the automatic distribution line 3. When the containers pass through the RFID channel machine 2, the first verification processor reads the box code affixed to the containers to obtain the goods information in the containers and perform the second verification after the RFID reads the RFID information of the goods in the containers, the containers enter the automatic distribution line 3, and the automatic distribution line 3 is provided with multiple distribution ports. The containers pass through the DWS equipment 4 before arriving at each distribution port. The second verification processor calculates the theoretical value of the weight and/or volume of the corresponding container according to the box code information scanned by the DWS equipment 4, compares it with the measured weight and/or volume of the container, completes the third verification, and enters the corresponding distribution port for loading and transportation according to the destination of the order after the verification is passed.

In the above system, the RFID picking vehicle 1 realizes multiple order picking at the same time, which requires the data processing center to merge all received store orders in advance, and only the orders that are merged together in accordance with preset conditions can be picked by the RFID picking vehicle 1 at the same time, so as to reduce the cost as much as possible under the premise of meeting the customer's personalized needs for delivery time or arrival time, and improve picking efficiency.

Warehouse centers refer to the warehouse and delivery center, such as the warehouse center of the clothing industry, which will receive orders from stores in various cities across the country. Typical store orders are different from ordinary personal orders, store orders usually include a certain number of various types of clothing goods for sale in the store. Therefore, typical store orders have requirements on delivery time or arrival time. In the actual scenario, there are cases in which stores place multiple scattered orders over a period of time, and the warehouse center needs to consider: (1) the packing efficiency of trucks sent to various cities; if orders are not merged, then the processing time of goods destined for a certain city may be spread out, resulting in trucks destined for that city being unable to depart. Therefore, when merging orders, it is necessary to consider centralizing processing of orders destined for a certain city to improve truck loading efficiency.

(2) Picking efficiency of RFID picking vehicles; generally, for the distribution of a single order, the optimal path planning can be carried out based on the storage location of each good. However, for multiple orders, if the optimal path planning is only based on the storage location of the goods in each order, it is possible that the highest picking efficiency cannot be achieved. If orders containing the same good can be distributed together when merging orders, the picking efficiency will be greatly improved. Or, although the goods are different, the storage locations are close to each other and the picking personnel can take them nearby, which will also improve picking efficiency.

(3) The size difference of multiple orders processed by an RFID picking vehicle at the same time; if an RFID picking vehicle completes the distribution tasks of 6 orders at the same time, 5 of the orders have been completed, and only one of the remaining orders needs more time to be distributed, then during this period of time, the picking personnel will only distribute goods for this order, which is not conducive to improving the efficiency of distribution.

(4) Weather conditions; if a rainstorm breaks out in a city three days later, the orders sent to the city may be processed the day after tomorrow according to the order sequence, which will lead to the orders arriving in the city at the time of the rainstorm, which is not conducive to delivery.

(5) Road condition information; if the highway section from the city where the warehouse center is located to the city where the order is received is closed for maintenance three days later, orders sent to that city need to be processed in time so that the orders can be sent out before the closure for maintenance.

(6) Transport vehicle conditions and other factors.

The above listed situations are only examples, and there may be other situations that need to be considered in practical applications. The present disclosure will not list them one by one. In order to minimize costs, improve picking efficiency, and avoid unnecessary troubles while meeting the personalized needs of customers for delivery time or arrival time, the present disclosure provides a multi-dimensional order merging method, specifically as described in the following embodiments.

Figure 2:
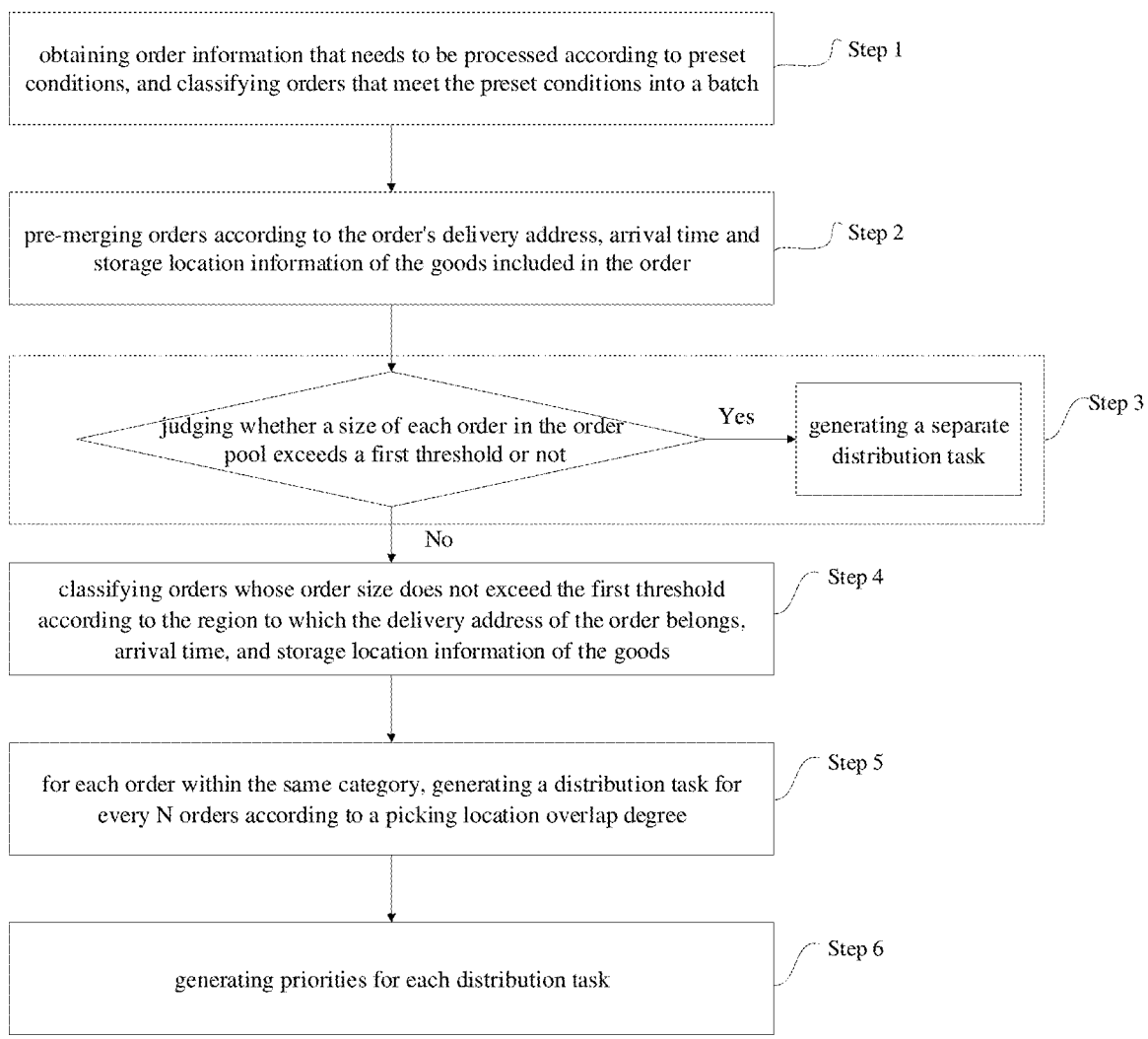
FIG. 2 is a flow chart of a multi-dimensional order merging method provided by the present disclosure.

Embodiment 1: this embodiment provides a multi-dimensional order merging method, as shown in FIG. 2. The method includes: Step 1: obtaining order information that needs to be processed according to preset conditions, and classifying orders that meet the preset conditions into a batch; the preset conditions includes time, region, goods or others.

Step 2: pre-merging orders according to the order's delivery address, arrival time and storage location information of the goods included in the order, and placing pre-merged orders as one order into an order pool together with other orders that have not been pre-merged, then executing the following Step 3; Step 3: judging whether a size of each order in the order pool exceeds a first threshold or not, and if it exceeds the first threshold, generating a separate distribution task for the order; if it does not exceed the first threshold, then proceeding to Step 4; and determining the first threshold according to a maximum order size that a RFID picking vehicle configured in the warehouse center can carry; Step 4: classifying orders whose order size does not exceed the first threshold according to the region to which the delivery address of the order belongs, arrival time, and storage location information of the goods included in the order; and the region to which the delivery address belongs refers to an administrative region or regions divided according to the sales model of the retail industry; and Step 5: for each order within the same category, generating a distribution task for every N orders according to a picking location overlap degree, where N is determined according to the sorting position configured by the RFID picking vehicle, and the picking position is a passage where the goods storage is located, or the picking position is a specific position of the passage corresponding to the goods storage.

The specific method of generating distribution tasks is method I or method II.

Method I: treating all orders classified into the same category as a processing unit; selecting orders with the largest order size from this processing unit; calculating the picking location overlap degree of the remaining orders with the largest size order, and generating a distribution task together with the N−1 orders that have the highest picking location overlap degree with the largest size order; removing the N orders corresponding to the distribution task from the processing unit; and executing the above process with the remaining orders in the processing unit as a new processing unit, until all orders in this category are generated as the distribution task.

Method II: treating all orders classified into the same category as a processing unit; selecting the order with the largest order size form the processing unit; calculating the picking location overlap degree of the remaining orders with the largest size order, and generating a first virtual order together with orders that have the highest picking location overlap degree with the largest size order; calculating the picking location overlap degree of the remaining orders with the first virtual order, and generating a second virtual order together with orders that have the highest picking location overlap degree of the first virtual order; . . . , and so on, until the N−1th virtual order is generated, generating a distribution task for the N orders included in the N−1th virtual order; and removing the N orders corresponding to the distribution task from the processing unit; and executing the above process with the remaining orders in the processing unit as a new processing unit, until all orders in this category are generated as the distribution task.

Embodiment 2: this embodiment provides a multi-dimensional order merging method. Specifically, the following dimensions are considered for specific merging: 1. arrival time required by the order; 2. order destination; 3. picking location overlap degree of the goods in the order; 4 order size; 5 goods in the order; 6 weather conditions; and 7 transport vehicle conditions and road condition information, etc.

As shown in FIG. 2, this embodiment takes a certain warehouse center as an example. The warehouse center receives orders from stores in various cities across the country. A specific order merging strategy adopted is: Step 1: obtaining order information that needs to be processed according to preset conditions, and classifying orders that meet the preset conditions into a batch; the preset conditions includes time, region, goods or others.

For example, classifying all orders received within a predetermined time range into one batch according to the order placing time; or classifying orders with the delivery address in the same region into one batch; or classifying orders containing specific goods into one batch; and other preset conditions can also be used according to the actual application scenario.

In practical applications, the screened orders can be classified into one batch according to the specific situation: for example, if the weather forecast is that there will be a rainstorm in Wuhan three days later, the data processing center can screen out all orders with destinations in Wuhan before orders merging and give priority to processing. For example, if the transportation department notifies that a certain highway section from the warehouse center to Guangzhou will be closed for maintenance three days later, the data processing center can also screen out all orders with destinations in Guangzhou and give priority to processing.

For another example, if the temperature across the country drops sharply and orders containing the specific goods of down jackets need to be prioritized, the data processing center will screen out the orders containing down jackets as a batch and give priority to processing.

Order information includes arrival time, goods type, size and corresponding quantity, delivery information (including consignee, contact number and delivery address), etc.

Figure 3:
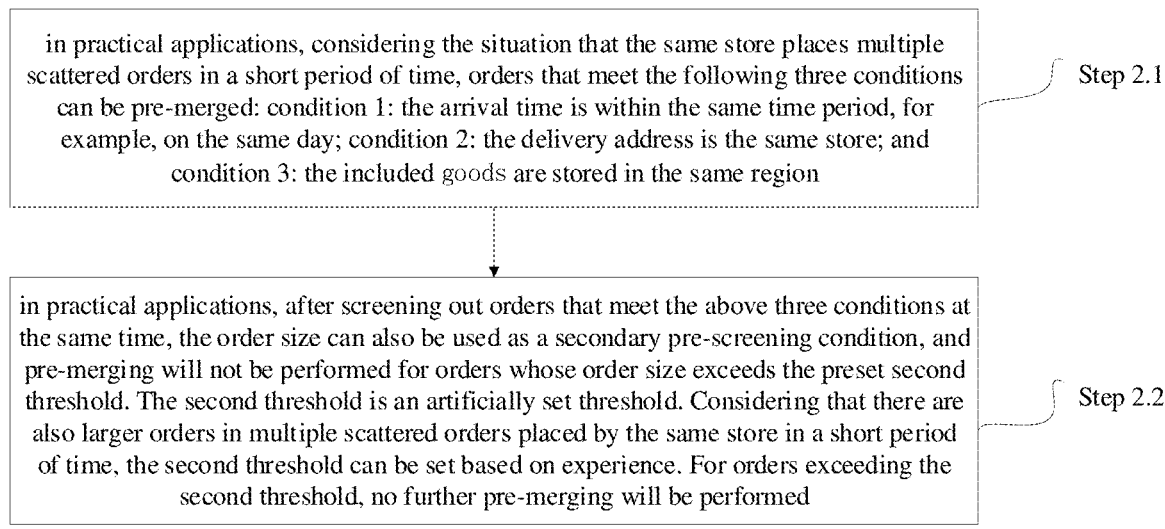
FIG. 3 is a Step 2 in practical application pre-merging order method provided by the present disclosure.

As shown in FIG. 3, Step 2: pre-merging orders according to the order's delivery address, arrival time and storage location information of the goods included in the order; and the storage location information of the goods is stored in the data processing center in advance.

Step 2.1: in practical applications, considering the situation that the same store places multiple scattered orders in a short period of time, orders that meet the following three conditions can be pre-merged: condition 1: the arrival time is within the same time period, for example, on the same day; condition 2: the delivery address is the same store; and condition 3: the included goods are stored in the same region.

After pre-merging, multiple scattered orders placed in the same store within a short period of time and the included goods picking locations are in the same region can be merged into one order.

Step 2.2: in practical applications, after screening out orders that meet the above three conditions at the same time, the order size can also be used as a secondary pre-screening condition, and pre-merging will not be performed for orders whose order size exceeds the preset second threshold. The second threshold is an artificially set threshold. Considering that there are also larger orders in multiple scattered orders placed by the same store in a short period of time, the second threshold can be set based on experience. For orders exceeding the second threshold, no further pre-merging will be performed.

After executing the above Step 2.1 and Step 2.2, placing pre-merged orders as one order into an order pool together with other orders that have not been pre-merged, and subsequently executing the following steps.

Step 3: judging whether a size of each order in the order pool exceeds a first threshold or not, and if it exceeds the first threshold, generating a separate distribution task for the order; if it does not exceed the first threshold, then proceeding to Step 4; and determining the first threshold according to a maximum order size that a RFID picking vehicle can carry; The first threshold is greater than the second threshold.

In this step, determining the first threshold according to a maximum order size that a RFID picking vehicle can carry. For example, the first threshold is set to 800 pieces, and the second threshold in the aforementioned Step 2.2 can be set to 300 pieces.

Step 4: classifying orders whose order size does not exceed the first threshold according to the region to which the delivery address of the order belongs, arrival time, and storage location information of the goods; and the region to which the delivery address belongs refers to an administrative region or regions divided according to the sales model of the retail industry.

For example, the administrative region includes the same city or the same province or other administrative regions, such as East China, North China, etc. The regions divided by the sales model of the retail format refer to the regions divided by the enterprise according to its own distribution model. For example, if there are two distributors in a certain city, then the city is divided into two distribution regions.

For example, orders that meet the following three conditions are divided into one category: condition 1: the delivery address belongs to the same province; condition 2: the arrival time is within the same time period, such as the same day; and condition 3: the included goods are stored in the same region.

Step 5: for each order within the same category, generating a distribution task for every N orders according to a picking location overlap degree; and the picking position is defined as a passage where the goods storage is located, or the picking position is defined as a specific position of the passage corresponding to the goods storage.

When the picking position is defined as a passage where the goods storage is located, the picking locations for all goods on the shelves on both sides of the same passage are the same.

When the picking position is defined as a specific position of the passage corresponding to the goods storage, the picking locations of the goods on the opposite storage locations on the shelves on both sides of the same passage are the same.

In practical applications, consider giving priority to orders with larger order sizes for distribution. The specific method of generating distribution tasks can be method I or method II.

Method I: selecting orders with the largest order size in the same category; calculating the picking location overlap degree of the remaining orders with the largest size order, and generating a distribution task together with the N−1 orders that have the highest picking location overlap degree with the largest size order; then selecting orders with the largest order size in the remaining orders, and calculating again the picking location overlap degree of each remaining order with the largest size order . . . , and repeating this step until all orders are merged and distribution tasks are generated. The picking location overlap degree refers to the proportion of the goods in the order with the largest order size that have the same picking position in any order to the total number of goods in the order with the largest order size.

Method II: selecting the order with the largest order size within the same category, subsequently calculating the picking location overlap degree of the remaining orders with the largest size order, merging an order with the highest picking location overlap degree with the largest size order into a virtual order, then calculating the picking location overlap degree of the remaining orders with this virtual order, further merging the order with the highest picking location overlap degree with the virtual order into an even larger virtual order, and repeating these steps until all N orders are merged into a virtual order. Finally, generating a distribution task for all the orders within this virtual order. Then selecting the order with the largest size from the remaining orders, and repeatedly executing this step until all orders are merged and distribution tasks are generated.

Step 6: generating priorities for each distribution task; in practical applications, the priority can be set based on the total quantity of goods included in the distribution task, or it can be set based on the arrival time, delivery address and ownership, or other factors.

For example, by calculating the total quantity of goods included in each distribution task, priority will be given to processing those with a larger quantity of goods.

For example, priority is given to processing distribution tasks with earlier arrival time based on the arrival time considered in Step S4.

For example, customize the priority of each province, city or region based on the delivery address considered in Step 4.

For example, considering the inventory of each good in the warehouse center, priority will be given to processing the distribution tasks involving goods with larger inventory.

The subsequent distribution process can be distributed to RFID picking vehicles for distribution according to the set priority.

Among the above steps, some steps may be adaptively adjusted according to the actual situation. For example, if the preset condition in Step 1 is region, that is, orders belonging to the same region are classified into one batch for processing, then in Step S4, when classifying orders with order sizes not exceeding the first threshold based on the region of the order's delivery address, the arrival time, and the storage location information of the goods included in the order, the consideration of the region of the order's delivery address can be a subordinate regional attribution. For instance, after Step 1 classifying orders belonging to the same province into one batch, when Step 4 classifying orders based on the region of the delivery address, the classification can be done at the level of the same city or other levels of regions.

The method of the present disclosure determines a multi-dimensional order merging method through the combination and arrangement of each dimension, which can meet the order merging requirements of the "live-streaming" warehousing system proposed by the inventor. According to this method, merged order processing tasks can distribute multiple orders at the same time to meet the premise of the personalized delivery needs of customers, reduce costs as much as possible, and improve delivery efficiency.

Some steps in the embodiments of the present disclosure can be implemented using software, and the corresponding software program can be stored in a readable storage medium, such as an optical disk or a hard disk.

The above are only preferred embodiments of the present disclosure and are not intended to limit the present disclosure. Any modifications, equivalent substitutions, improvements, etc. made within the spirit and principles of the present disclosure shall be included in the protection range of the present disclosure.

What is claimed is:

1. A non-transitory computer readable storage medium containing computer executable instructions, which when executed configure at least one computer processor to perform a multi-dimensional order merging method, wherein the method comprising:

Step 1: using the at least one computer processor, obtaining order information that needs to be processed according to preset conditions, and classifying orders that meet the preset conditions into a batch;

Step 2: using the at least one computer processor, pre-merging orders according to the order's delivery address, arrival time and storage location information of the goods included in the order, and placing pre-merged orders as one order into an order pool together with other orders that have not been pre-merged, then executing the following Step 3;

Step 3: using the at least one computer processor, judging whether a size of each order in the order pool exceeds a first threshold or not, and if it exceeds the first threshold, generating a separate distribution task for the order; if it does not exceed the first threshold, then proceeding to Step 4; and determining the first threshold according to a maximum order size that a Radio Frequency Identification (RFID) picking vehicle can carry, wherein the size of each order in the order pool is determined by a Dimensioning, Weighing and Scanning (DWS) equipment when a container of each order passes through the DWS equipment configured on an automatic distribution line;

Step 4: using the at least one computer processor, classifying orders whose order size does not exceed the first threshold according to the region to which the delivery address of the order belongs, arrival time, and storage location information of the goods included in the order; and Step 5: using the at least one computer processor, for each order within the same category, generating a distribution task for every N orders according to a picking location overlap degree, where N is determined according to the sorting position configured by the RFID picking vehicle;

wherein Step 5 comprises: using the at least one computer processor, treating all orders classified into the same category as a processing unit; using the at least one computer processor, selecting orders with the largest order size from any processing unit; using the at least one computer processor, calculating the picking location overlap degree of the remaining orders in the processing unit with the largest size order, and generating a distribution task together with the N-1 orders that have the highest picking location overlap degree with the largest size order; removing the N orders corresponding to the distribution task from the processing unit; and using the at least one computer processor, executing the above process with the remaining orders in the processing unit as a new processing unit, until all orders in this category are generated as the distribution task; or wherein Step 5 comprises: using the at least one computer processor, treating all orders classified into the same category as a processing unit; using the at least one computer processor, selecting the order with the largest order size form any processing unit; using the at least one computer processor, calculating the picking location overlap degree of the remaining orders with the largest size order, and generating a first virtual order together with orders that have the highest picking location overlap degree with the largest size order; using the at least one computer processor, calculating the picking location overlap degree of the remaining orders with the first virtual order, and generating a second virtual order together with orders that have the highest picking location overlap degree of the first virtual order; repeating generating until the N-1th virtual order is generated, generating a distribution task for the N orders included in the N-1th virtual order; and removing the N orders corresponding to the distribution task from the processing unit; and using the at least one computer processor, executing the above process with the remaining orders in the processing unit as a new processing unit, until all orders in this category are generated as the distribution task.

2. The non-transitory computer readable storage medium according to claim 1, wherein the preset conditions in Step 1 comprises time, region, goods or others.

3. The non-transitory computer readable storage medium according to claim 2, wherein Step 1 comprises: using the at least one computer processor, classifying all orders received within a predetermined time range into one batch according to the order placing time; or using the at least one computer processor, classifying orders with the delivery address in the same region into one batch; or using the at least one computer processor, classifying orders containing specific goods into one batch.

4. The non-transitory computer readable storage medium according to claim 1, wherein Step 2 comprises: using the at least one computer processor, pre-merging orders that simultaneously meet the following conditions into one order: condition 1: the arrival time is within the same time period; condition 2: the delivery address is completely identical; and condition 3: the included goods are stored in the same region.

5. The non-transitory computer readable storage medium according to claim 4, wherein before Step 2, which involves using the at least one computer processor, pre-merging orders that simultaneously meet the above-mentioned conditions 1 to 3 into one order, further comprising: using the at least one computer processor, judging whether the size of each order that simultaneously meets the above-mentioned conditions 1 to 3 exceeds a second threshold; if the size of orders that simultaneously meet the above-mentioned conditions 1 to 3 exceeds the second threshold, no pre-merging will be performed and it will be directly placed into the order pool; and the second threshold is an artificially set threshold.

6. The non-transitory computer readable storage medium according to claim 1, wherein Step 4 comprises: using the at least one computer processor, classifying orders that meet the following three conditions into one category: condition 1: the delivery address belongs to a same region, and the region refers to an administrative region or regions divided according to the sales model of the retail industry; condition 2: the arrival time is within the same time period; and condition 3: the included goods are stored in the same region.

7. The non-transitory computer readable storage medium according to claim 1, wherein the picking position is a passage where the goods storage is located, or the picking position is a specific position of the passage corresponding to the goods storage.

8. The non-transitory computer readable storage medium according to claim 1, further comprises: Step 6: using the at least one computer processor, setting priority for each distribution task according to custom factors, the custom factors comprises arrival time, the region to which the delivery address belongs, order size, goods included in the order or goods inventory in the warehouse center.

\* \* \* \* \*